United States Patent
Stuhldreher

(10) Patent No.: US 7,360,568 B2
(45) Date of Patent: Apr. 22, 2008

(54) TIRE HAVING NARROWING SIPES

(75) Inventor: Terrence M. Stuhldreher, Wadsworth, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 265 days.

(21) Appl. No.: 11/044,584

(22) Filed: Jan. 27, 2005

(65) Prior Publication Data
US 2006/0162832 A1 Jul. 27, 2006

(51) Int. Cl.
*B60C 11/04* (2006.01)
*B60C 11/12* (2006.01)

(52) U.S. Cl. ............. 152/209.18; 152/901; 152/DIG. 3

(58) Field of Classification Search ............. 152/209.1, 152/209.18, 900, 901, DIG. 3; D12/587, D12/590, 591
See application file for complete search history.

(56) References Cited

U.S. PATENT DOCUMENTS

| | | | |
|---|---|---|---|
| 2,104,532 A * | 1/1938 | Sommer ................. 152/DIG. 3 |
| 3,693,687 A * | 9/1972 | Hannover et al. .......... 152/900 |
| 3,847,698 A * | 11/1974 | Ravenhall .................. 152/900 |
| 4,387,754 A * | 6/1983 | Mirtain et al. ............... 152/901 |
| 4,449,560 A * | 5/1984 | Tansei et al. ................ 152/900 |
| 4,574,856 A * | 3/1986 | Graas .................... 152/DIG. 3 |
| D318,035 S | 7/1991 | Enoki et al. |
| 5,131,444 A | 7/1992 | Kukimoto et al. |
| D352,487 S | 11/1994 | Paulin et al. |
| D381,942 S | 8/1997 | Ford, III et al. |
| D388,030 S | 12/1997 | Schuster |
| D388,031 S | 12/1997 | Loeffler et al. |
| D390,170 S | 2/1998 | Stone et al. |
| 5,814,169 A * | 9/1998 | Yamaguchi et al. ... 152/DIG. 3 |
| 5,833,781 A * | 11/1998 | Fukumoto et al. ..... 152/DIG. 3 |
| 5,873,399 A | 2/1999 | Ochi et al. |
| D413,556 S | 9/1999 | Krupa et al. |
| 6,196,288 B1 | 3/2001 | Radulescu et al. |
| D455,380 S | 4/2002 | Traulle |
| D483,320 S | 12/2003 | Janajreh et al. |
| 2003/0005992 A1 | 1/2003 | Radulescu |
| 2003/0101851 A1* | 6/2003 | Domange et al. .......... 76/101.1 |
| 2003/0111149 A1* | 6/2003 | Caretta et al. ........... 152/209.1 |
| 2003/0192634 A1 | 10/2003 | Hino |
| 2005/0150582 A1* | 7/2005 | Matsumura ............ 152/209.18 |

FOREIGN PATENT DOCUMENTS

JP 02-303908 * 12/1990

* cited by examiner

*Primary Examiner*—Steven D. Maki
(74) *Attorney, Agent, or Firm*—Steven M. Auvil; Thomas R. Kingsbury

(57) ABSTRACT

A tire having sipes is provided. The tire includes a circumferential tread configured with at least one rib bound by at least one groove. The rib has a plurality of sipes that extend from the groove into the rib wherein one or more of the sipes narrow in a direction from the groove into the rib.

8 Claims, 3 Drawing Sheets

TIRE HAVING NARROWING SIPES

FIELD OF INVENTION

The present application is directed to a motor vehicle tire, and more particularly, to a motor vehicle tire that has narrowing sipes that extend from a groove in the tire tread into a rib or shaped block in the tire tread.

BACKGROUND

Many motor vehicle tires have a circumferential tread provided with a plurality of circumferential grooves that define ribs therebetween. Typically, generally lateral slots can be provided in the ribs to form a plurality of shaped blocks. These shaped blocks can be distributed along the tread according to a specific pattern. Sipes, which are generally narrow slits cut into the tread, can be provided in the shaped blocks in a specific pattern.

Within the tread pattern in which the circumferential grooves are provided, the shaped blocks are typically distributed in several side by side rows. A proper distribution of the shaped blocks gives the tire the desired characteristics of directional control stability and road gripping in relation to the sidewise thrusts directed parallel to the wheel axis. The lateral slots, in turn, give the tire the desired road traction, that is the capability of efficiently transmitting tangential thrusts parallel to the running direction during speeding up and slowing down of the vehicle. In principle, the traction of the tire tends to become greater as the number of the lateral slots arranged in the tread increases and the orientation of the slots themselves approach an orientation that is perpendicular to the running direction of the tire. Additionally, the circumferential grooves and lateral slots cooperate in performing an efficient draining action of water from the tread pattern area of the tire during running on a wet road bed. Finally, the sipes, if present in the shaped blocks, can improve wet traction of the tire as well as snow and ice traction.

The presence of the longitudinal grooves and lateral slots, however, causes the well known effect of noise produced by a rolling tire. One type of noise, known as organ pipe noise, is a consequence of the circumferential grooves that become active in the contact patch of the tire. A pressurized air column is formed in the circumferential grooves between the ground contact portion of the tire and the road surface, and this produces sound as a consequence of the resonance of the air column. The wavelength of the sound is substantially constant and is independent of the speed of the tire.

Another type of tire noise, known as pumping noise, can be generated by a high speed flow of air in the lateral slots that can also activate noise from the circumferential grooves. Yet another type of noise, known as pitch noise, can be generated by the tread pattern elements as a consequence of their circumferential pitch arrangement. Finally, if sipes are present in the shaped blocks, sizzle noise can be generated by the rubbing of the parallel walls of the sipes when shaped blocks deform as they impact the road bed.

SUMMARY

The present application is directed to a tire including a circumferential tread configured with at least one rib bound by at least one groove. The rib has a plurality of sipes that extend from the groove into the rib wherein one or more of the sipes narrow in a direction from the groove into the rib.

Also, the present application is directed to a tire including a circumferential tread provided with at least one circumferential groove adjacent at least one circumferential rib. The rib has a first edge portion adjacent the groove, a second edge portion opposite the first edge portion, and an inner portion disposed therebetween. The rib also includes a plurality of sipes that extend from the first edge portion of the rib into the inner portion of the rib wherein at least some of the sipes have a width that decreases in size towards the inner portion of the rib.

Furthermore, the present application is directed to a tire tread including multiple spaced-apart circumferential grooves configured to divide the tread into multiple circumferential ribs. Each rib has a plurality of circumferentially spaced-apart sipes that extend from an adjacent groove into the rib wherein the sipes decrease in size towards the rib.

Finally, the present application is directed to a method of suppressing tire rotation noise in a tire having a tread configured with at least one circumferential rib bound by at least one circumferential groove. The method includes the step of providing a plurality of sipes in the rib, the sipes extending from the groove into the rib and decreasing in width towards the rib.

BRIEF DESCRIPTION OF THE DRAWINGS

In the accompanying drawings, embodiments of a tire and tire tread are illustrated that, together with the detailed description given below, describe example embodiments of the claimed invention. It will be appreciated that the illustrated boundaries of elements in the figures represent one example of the boundaries. One of ordinary skill in the art will appreciate that one element may be designed as multiple elements or that multiple elements may be designed as a single element. An element shown as an internal component of another element may be implemented as an external component and vice-versa.

Further, in the accompanying drawings and description that follow, like parts are indicated throughout the drawings and description with the same reference numerals, respectively. The figures are not drawn to scale and the proportions of certain parts have been exaggerated for convenience of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially," as used herein, refer to a direction that is parallel to the axis of rotation of a tire.

"Circumferential" and "circumferentially," as used herein, refer to a direction extending along the perimeter of the surface of the annular tread perpendicular to the axial direction.

"Groove," as used herein, refers to an elongated void area in the tread of the tire that extends circumferentially in a straight, curved or zig-zag manner.

"Lateral," as used herein, refers to a direction along the tread of the tire going from one sidewall of a tire to the other sidewall.

"Radial" and "radially," as used herein, refer to a direction perpendicular to the axis of rotation of a tire.

"Sipe," as used herein, refers to a thin slit formed in the surface of the tread that may extend laterally, circumferentially, or at an acute angle relative to the circumferential direction of the tire. A sipe can have a depth that is up to 100% of the maximum depth of a groove formed in the tire.

"Sidewall," as used herein, refers to that portion of the tire between the tread and the bead.

"Tread," as used herein, refers to that portion of the tire that comes into contact with the road under normal inflation and load.

Figure 1:
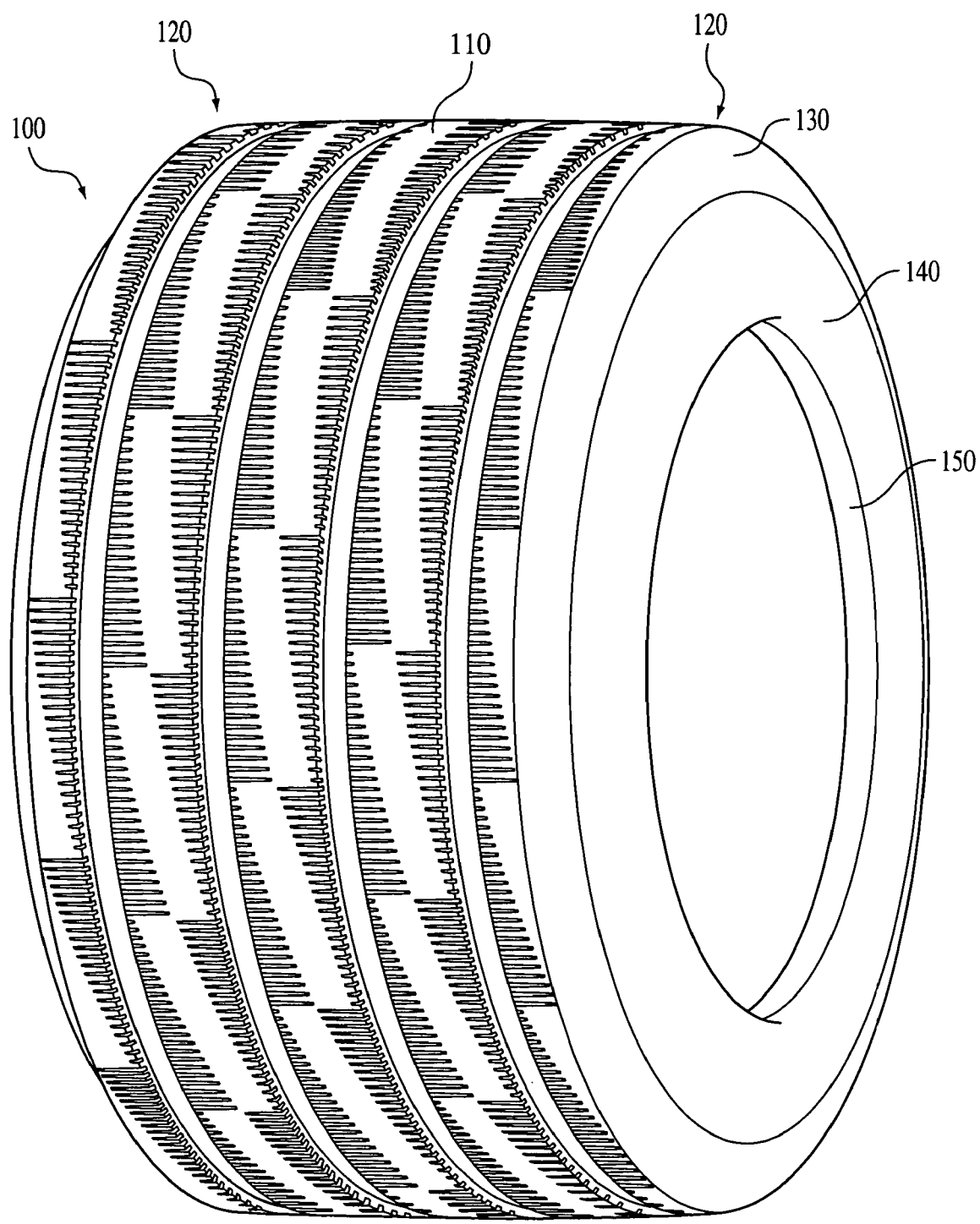
FIG. 1 is a perspective view of one embodiment of a tire 100 having narrowing sipes.
Figure 2:
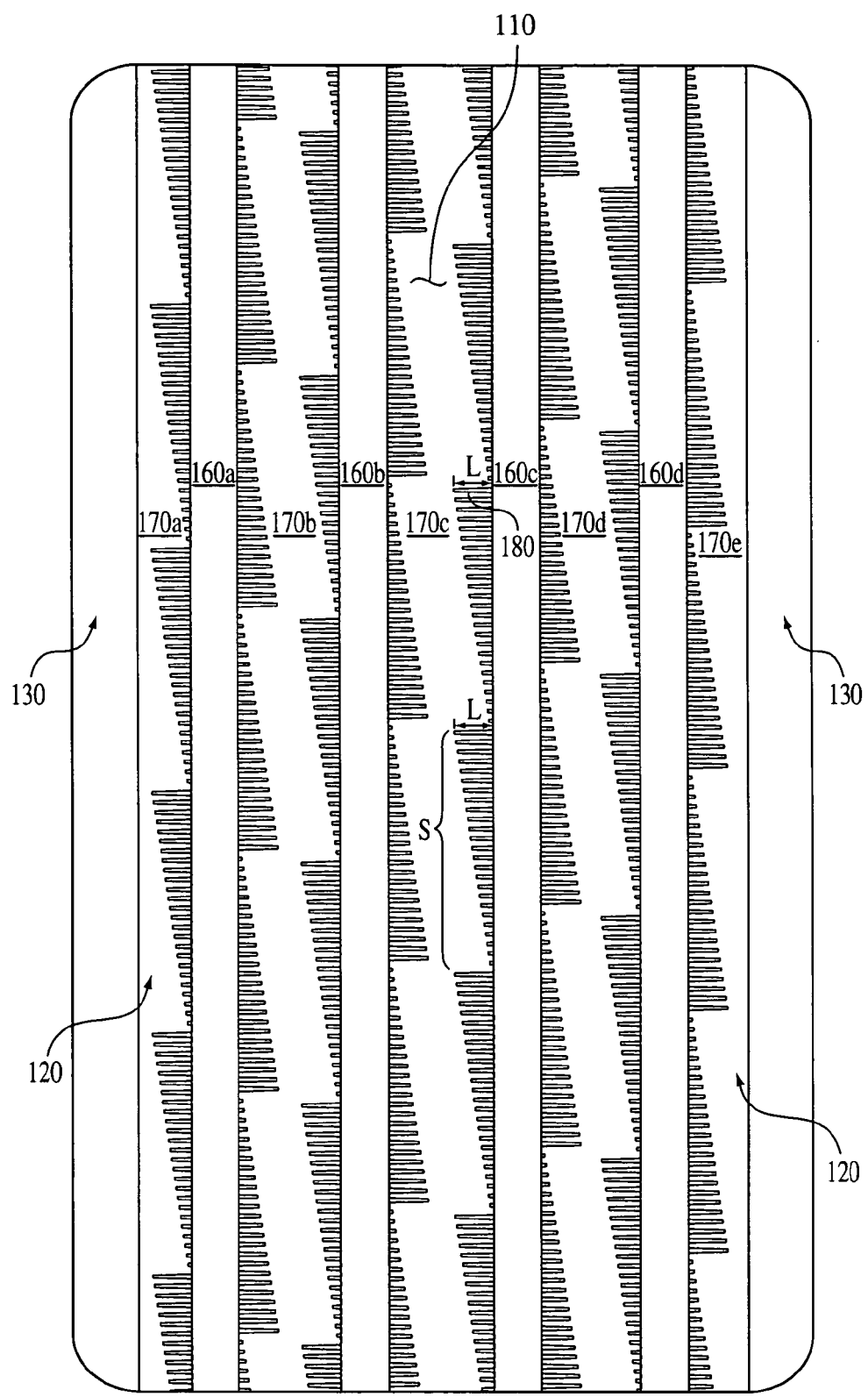
FIG. 2 is a fragmentary plan view of the tread 110 of the tire 100 illustrated in FIG. 1.

Illustrated in FIGS. 1 and 2 are perspective and fragmentary plan views, respectively, of one embodiment of a tire 100 configured with narrowing sipes, which will be discussed in further detail below. The tire 100 includes a ground contacting tread 110 extending circumferentially around the tire 100. The tread 110 has a pair of lateral edge portions 120, each of which are flanked by a shoulder region 130 that extends radially inwardly to a sidewall 140. Each sidewall 140 terminates at its radially inner end in a bead portion 150 utilized for fitting the tire onto a rim.

In one embodiment, the tread 110 is provided with a plurality of grooves 160a-d that extend circumferentially around tire 100 and divide the tread 110 into axially spaced-apart circumferential ribs 170a-e. It will be appreciated that the tread 110 can be configured with one or more grooves and ribs depending on the desired tread pattern and performance characteristics.

In one embodiment, one or more of the grooves 160a-d can have a substantially constant or uniform cross-section around the circumference of tire 100. For example, the cross-section of the grooves 160a-d can be generally rectangular shaped around the entire circumference of the tire 100. It will be appreciated that one or more of the grooves 160a-d can take the form of other substantially constant cross-sectional shapes such as square, triangular, semi-circular or another geometrical shape. Alternatively, one or more of the grooves 160a-d can have a variable cross-section that extends around the circumference of the tire 100. For example, the cross-section of one or more of the grooves 160a-d can include alternating wide and narrow portions (not shown) along its circumference.

With reference to FIG. 2, the ribs 170a-e can be provided with a plurality of sipes 180 that extend into at least a portion of the ribs 170a-e. As shown in FIG. 2, the sipes 180 are in communication with the grooves 160a-d. However, it will be appreciated that the tire 100 may include sipes that are not in communication with one or more of the grooves 160a-d. Furthermore, although sipes 180 are depicted on each of the ribs 170a-e, it will be appreciated that one or more of the ribs 170a-e may be provided without sipes 180.

Figure 3:
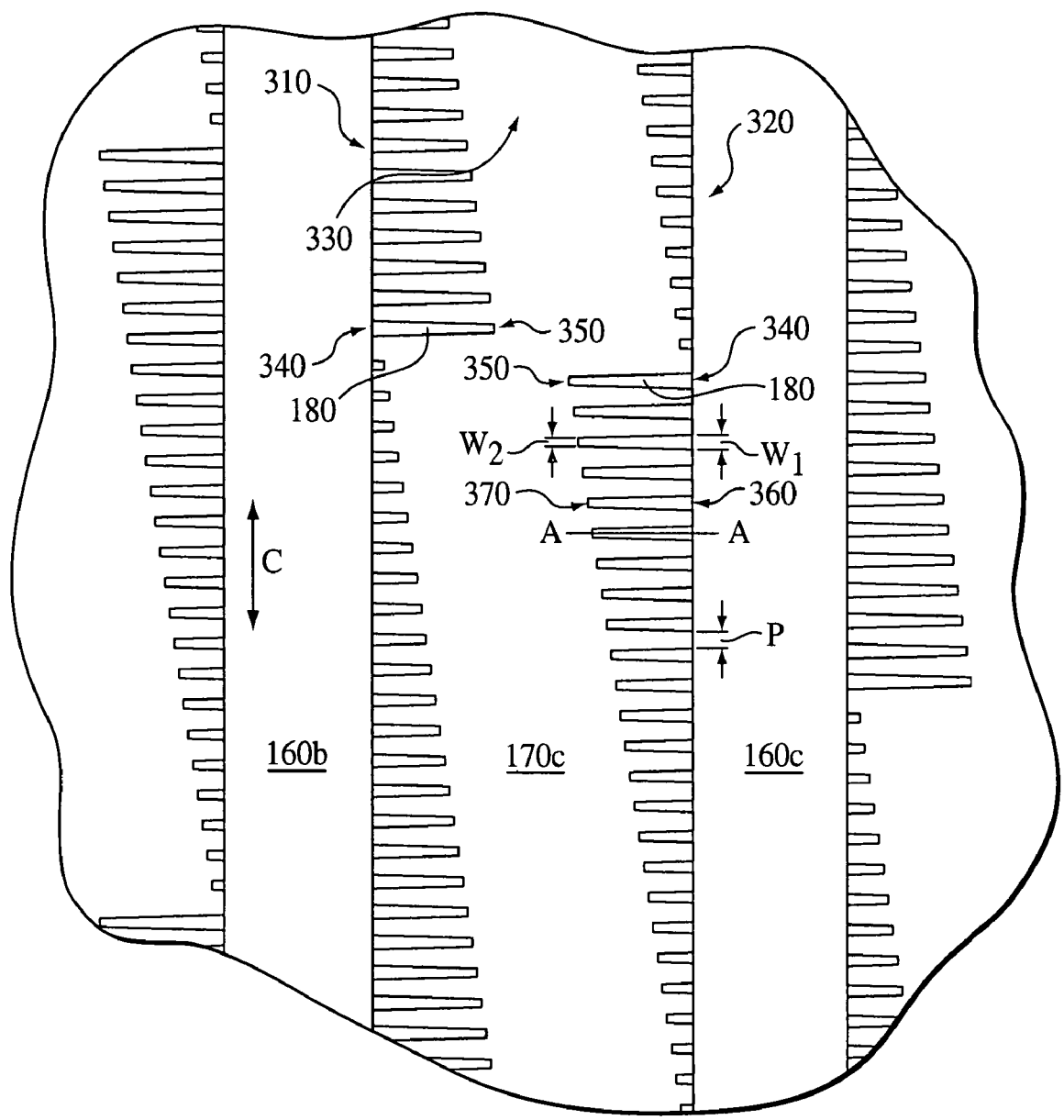
FIG. 3 illustrates an exploded view of a portion of the tread 110 of the tire 100 illustrated in FIG. 2.

FIG. 3 is an exploded plan view of a portion of the tread 110 of the tire 100 depicted in FIG. 2 that illustrates the sipes 180 provided in the rib 170c in greater detail. As shown in FIG. 3, the rib 170c includes a first edge portion 310 adjacent the groove 160b, a second edge portion 320 adjacent the groove 160c, and an inner portion 330 disposed therebetween. Sipes 180 are provided in the rib 170c along the first edge portion 310 of the rib 170c such that they extend from the groove 160b into the inner portion 330 of the rib 170c. Similarly, sipes 180 are provided in the rib 170c along the second edge portion 320 of the rib 170c such that they extend from the groove 160c into the inner portion 330 of the rib 170c. Each sipe 180 includes a first end portion 340 that communicates with the groove 160b and a second end portion 350 that is provided in the inner portion 330 of the rib 170c. It will be appreciated that the sipes may be provided on only one edge portion of one or more of the ribs 170a-e.

In one embodiment, one or more of the sipes 180 are dimensioned such that they narrow in a direction from the grooves 160b,c into the rib 170c. In other words, one or more of the sipes 180 have a width that decreases in size towards the rib 170c. For example, as shown in FIG. 3, the width $W_1$ of the first end portion 340 of the sipe 180 (i.e., the portion of the sipe 180 adjacent the groove) is greater than the width $W_2$ of the second end portion 350 of the sipe 180. Hence, the sipes 180 may hereafter be referred to as "narrowing sipes."

By providing narrowing sipes 180 in one or more of the ribs 170a-e, organ pipe noise, which may be generated in one or more of the grooves 160a-d, is suppressed or even eliminated. For example, the first end portions 340 of the narrowing sipes 180, which are in communication with one or more of the grooves 160a-d, serve as guides to direct pressure waves that form in the grooves 160a-d into the narrowing sipes 180. Once in the narrowing sipes 180, some (if not all) of the pressure waves become trapped. By trapping the pressure waves in the narrowing sipes 180, the pressure waves are attenuated, thereby reducing or even eliminating organ pipe noise. Additionally, the narrowing sipes 180 reduce or eliminate sizzle noise. Since the walls of one or more of the narrowing sipes 180 are not oriented parallel to each other (i.e., at least one of the walls is oriented at an acute angle relative to an adjacent groove), rubbing of the walls of the narrowing sipes 180 is reduced or even eliminated.

Generally, the greater the ratio between the width $W_1$ of the first end portion 340 and the width $W_2$ of the second end portion 350 of the narrowing sipe 180, the greater the suppression or reduction of organ pipe and sizzle noise. In this manner, the widths of the narrowing sipes 180 can be dimensioned accordingly to achieve the desired noise reduction levels. For example, the ratio between the width $W_1$ of the first end portion 340 and the width $W_2$ of the second end portion 350 of the sipe 180 can be at least 2:1. It will be appreciated, however, that the ratio can be less than 2:1.

In one embodiment, the narrowing sipes 180 are spaced-apart from each other around the circumference of one or more of the ribs 170a-e at a predetermined pitch P. Generally, the larger the pitch P, the greater the suppression of organ pipe noise due to the increase in number of pressure wave attenuators provided in one or more of the ribs 170a-e. In this manner, the pitch P of the narrowing sipes 180 can be dimensioned accordingly to achieve the desired noise reduction levels. For example, the predetermined pitch P can be less than about five times the largest width of the narrowing sipes 180.

Generally, the addition of sipes to a rib or shaped block improves the wet traction of a tire. For example, as the tire rolls, the sipes present multiple "edges" to the wet surface. These edges can cut through water, thereby gripping the pavement. Thus, the more sipes provided in a rib or shaped block, the greater the circumferential edge density of the tire, which results in improved wet traction of the tire. More specifically, sipes that extend from a groove into an adjacent rib or shaped block further improve the wet traction of a tire. For example, because sipes are relatively thin, water is drawn inside them by capillary action that assists in drying the wet road. Also, water is pumped from the road surface into the groove and expelled from the sipes provided in adjacent ribs or shaped blocks. Accordingly, since the narrowing sipes 180 extend from one or more of the grooves 160a-d, the narrowing sipes 180 improve wet traction of the tire 100 in the same manner as described above.

Generally, sipes provided in a rib or shaped block also improve snow and ice traction of a tire. For example, sipes act as fingers to grip the snow and ice, thereby improving traction of the tire. By increasing the circumferential edge density of the tire as discussed above, the number of fingers are increased, thereby increasing snow and ice traction. Accordingly, the narrowing sipes 180 improve snow and ice traction of the tire 100 in the same manner as described above.

In one embodiment, one or more of the narrowing sipes 180 has a substantially trapezoidal configuration as shown in FIG. 3. The substantially trapezoidal configuration includes a major base 360 communicating with the groove 160b and a minor base 370 provided in the inner portion 330 of the rib 170c. It will be appreciated that the narrowing sipes 180 can have other configurations in which their widths decrease in size such as a triangular configuration with a sharp or rounded apex provided in the inner portion 330 of the rib 170c.

In one embodiment, one or more of the narrowing sipes 180 has a longitudinal axis that is substantially perpendicular to a circumferential direction C of the tire 100. For example, the narrowing sipes 180 can have a longitudinal axis A that is oriented substantially perpendicular to the circumferential direction of the tire 100 as shown in FIG. 3. Alternatively, one or more of the narrowing sipes 180 can be oriented at an acute angle of less than 90 degrees with respect to the circumferential direction of the tire. Generally, as the angle of the narrowing sipe 180 increases, the snow traction of the tire 100 decreases.

With reference to FIG. 2, the length L of the narrowing sipes 180 can be varied to achieve a desired pattern. For example, the lengths of the narrowing sipes 180 can be incrementally increased in a circumferential direction of the tire 100 along a portion of the ribs 170a-e, thereby forming a sub-pattern S. The sub-pattern S can be repeated as shown in FIG. 2 to form a zigzag pattern in the tread 110.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A tire tread comprising:
   multiple spaced-apart circumferential grooves configured to divide the tread into multiple circumferential ribs,
   wherein each rib having a first edge adjacent a groove, a second edge opposite the first edge, and an inner portion disposed therebetween,
   wherein at least one rib includes a plurality of sipes that each extend from an adjacent groove into the inner portion of such rib and decrease in size towards the inner portion of the rib,
   wherein a group of adjacent sipes are arranged in a sub-pattern, such that the adjacent sipes incrementally decrease in length along a circumferential direction of the tire,
   wherein at least some of the sipes that extend from the first edge of each rib each have a substantially triangular configuration that includes a major base communicating with the groove and an apex provided in the inner portion of the rib.

2. The tire tread of claim 1 wherein the sub-pattern is repeated around the circumference of the tire to form a zigzag pattern in the at least one rib.

3. A tire comprising:
   a circumferential tread provided with multiple spaced-apart circumferential grooves configured to divide the tread into multiple circumferential ribs,
   wherein each rib has a first edge adjacent one of the grooves, a second edge opposite the first edge, and an inner portion disposed therebetween,
   wherein each rib includes a plurality of sipes that each extend from the first edge of such rib into the inner portion of such rib, such that the sipes are in communication with a respective groove adjacent the first edge of such rib, wherein the sipes have a width that decreases in size towards the inner portion of such rib,
   wherein at least one of the ribs includes a plurality of sipes that extend from the second edge of such rib towards the inner portion of such rib and have a width that decreases towards the inner portion of such rib,
   wherein a group of adjacent sipes that extend from the first edge of each rib are arranged in a sub-pattern, such that the adjacent sipes incrementally decrease in length along a circumferential direction of the tire,
   wherein at least some of the sipes that extend from the first edge of each rib each have a substantially trapezoidal configuration that includes a major base communicating with the groove and a minor base provided in the inner portion of the rib.

4. The tire of claim 3 wherein the sipes that extend from the first edge of each rib each include a first end portion in communication with a respective groove adjacent the first edge of such rib and a second end portion provided in the inner portion of such rib.

5. The tire of claim 4 wherein the first end portions of each sipe have a first width and the second end portions of each sipe have a second width, the ratio between the first width and the second width being at least about 2:1.

6. The tire of claim 3 wherein the sipes that extend from the first edge of each rib are provided in each rib at a predetermined pitch along a circumferential direction of the tire.

7. The tire of claim 6 wherein the predetermined pitch is less than about five times the largest width of the one or more sipes.

8. The tire of claim 3 wherein a group of adjacent sipes that extend from the second edge of each rib are arranged in a sub-pattern, such that the adjacent sipes incrementally increases in length along a circumferential direction of the tire.

* * * * *